US009415564B2

(12) United States Patent
Breuer et al.

(10) Patent No.: US 9,415,564 B2
(45) Date of Patent: Aug. 16, 2016

(54) FELT FOR FORMING FIBER CEMENT ARTICLES AND RELATED METHODS

(71) Applicant: Huyck Licensco, Inc., Raleigh, NC (US)

(72) Inventors: Hans-Peter Breuer, Zell (DE); Engelbert Diabl, Breitenstein (AT)

(73) Assignee: Huyck Licensco, Inc., Youngsville, NC (US)

( * ) Notice: Subject to any disclaimer, the term of this patent is extended or adjusted under 35 U.S.C. 154(b) by 52 days.

(21) Appl. No.: 14/491,104

(22) Filed: Sep. 19, 2014

(65) Prior Publication Data

US 2015/0024128 A1 Jan. 22, 2015

Related U.S. Application Data

(63) Continuation of application No. 13/534,353, filed on Jun. 27, 2012, now abandoned.

(60) Provisional application No. 61/504,794, filed on Jul. 6, 2011.

(51) Int. Cl.
*D21F 7/08* (2006.01)
*B32B 5/02* (2006.01)
(Continued)

(52) U.S. Cl.
CPC . *B32B 5/024* (2013.01); *B32B 5/08* (2013.01); *B32B 5/26* (2013.01); *C04B 28/02* (2013.01); *D03D 1/0094* (2013.01); *B32B 2250/02* (2013.01); *B32B 2250/20* (2013.01);
(Continued)

(58) Field of Classification Search
CPC ..... D21F 1/0027; D21F 7/083; D21F 1/0036; D21F 7/10; D21F 1/0054; D21F 3/029; D21F 7/08; D21F 1/0045; Y10S 162/903; Y10S 162/90; Y10S 162/902; Y10S 260/23; D03D 15/00; D03D 11/00; D03D 15/002; D03D 1/0094; D03D 3/04; D03D 25/00; D03D 2700/0162; D10B 2505/00; B32B 5/024; B32B 5/12
USPC ........ 162/358.1, 358.2, 900–904, 348, 358.4; 139/383 A, 425 A, 426 R, 426 TW; 428/114, 222, 358, 364–365, 369–371, 428/397–400, 189–196, 270
See application file for complete search history.

(56) References Cited

U.S. PATENT DOCUMENTS 3,158,984 A * 12/1964 Butler .............................. 57/210
3,214,326 A 10/1965 Lee
(Continued)

FOREIGN PATENT DOCUMENTS

EP 0 089 032 9/1983
EP 0 341 043 11/1989
(Continued)

OTHER PUBLICATIONS

U.S. Appl. No. 09/763,125, filed Mar. 20, 2002, Marchand.
(Continued)

*Primary Examiner* — Bobby Muromoto, Jr.
(74) *Attorney, Agent, or Firm* — Myers Bigel & Sibley, P.A.

(57) ABSTRACT

A fiber cement felt includes: a base fabric layer including MD and CMD yarns interwoven with each other, wherein the CMD yarns comprise twisted monofilaments; and at least one batt layer overlying the base fabric layer.

10 Claims, 2 Drawing Sheets

(51) Int. Cl.
*C04B 28/02* (2006.01)
*D03D 1/00* (2006.01)
*B32B 5/08* (2006.01)
*B32B 5/26* (2006.01)
*D03D 25/00* (2006.01)

(52) U.S. Cl.
CPC . *B32B2262/0261* (2013.01); *B32B 2262/0269* (2013.01); *B32B 2262/04* (2013.01); *B32B 2262/12* (2013.01); *Y10T 442/3073* (2015.04)

(56) References Cited

U.S. PATENT DOCUMENTS

| | | | |
|---|---|---|---|
| 3,839,136 A * | 10/1974 | Eriksson | 442/191 |
| 4,077,577 A | 3/1978 | Wright | |
| 4,105,495 A * | 8/1978 | Pai | 162/348 |
| 4,141,388 A * | 2/1979 | Romanski et al. | 139/383 AA |
| 4,216,043 A | 8/1980 | Gazzard et al. | |
| 4,283,454 A * | 8/1981 | Buchanan | 442/215 |
| 4,290,209 A * | 9/1981 | Buchanan et al. | 34/123 |
| 4,306,911 A | 12/1981 | Gordon | |
| 4,356,225 A | 10/1982 | Dufour | |
| 4,369,218 A | 1/1983 | Mazere | |
| 4,403,632 A * | 9/1983 | Romanski et al. | 139/383 A |
| 4,461,803 A | 7/1984 | Booth | |
| 4,467,839 A | 8/1984 | Westhead | |
| 4,495,235 A | 1/1985 | Tesch | |
| 4,500,588 A | 2/1985 | Lundstrom | |
| 4,503,113 A | 3/1985 | Smart | |
| 4,632,716 A * | 12/1986 | Smith | 156/148 |
| 4,737,241 A | 4/1988 | Gulya | |
| 4,772,328 A | 9/1988 | Pfeifer | |
| 4,784,190 A * | 11/1988 | Mullaney | 139/383 A |
| 4,806,208 A | 2/1989 | Penven | |
| 4,991,630 A | 2/1991 | Penven | |
| 4,998,569 A * | 3/1991 | Tate | 139/383 A |
| 5,050,646 A * | 9/1991 | Fry | 156/470 |
| 5,110,672 A | 5/1992 | Zehle | |
| 5,143,684 A | 9/1992 | Stein | |
| 5,204,171 A | 4/1993 | Eachmann | |
| 5,225,269 A | 7/1993 | Bohlin | |
| 5,277,967 A | 1/1994 | Zehle | |
| 5,308,673 A | 5/1994 | Tochacek | |
| 5,360,656 A | 11/1994 | Rexfelt | |
| 5,368,696 A | 11/1994 | Cunnane, III | |
| 5,372,876 A | 12/1994 | Johnson | |
| 5,411,062 A | 5/1995 | Lee | |
| 5,476,123 A | 12/1995 | Rydin | |
| 5,482,756 A | 1/1996 | Berger | |
| 5,531,251 A | 7/1996 | Rydin | |
| 5,549,967 A | 8/1996 | Gstrein | |
| 5,601,120 A | 2/1997 | Kuckart | |
| 5,635,298 A * | 6/1997 | Delker | 428/373 |
| 5,652,057 A * | 7/1997 | Delker | 428/373 |
| 5,731,063 A | 3/1998 | Schultz | |
| 5,785,818 A | 7/1998 | Fekete | |
| 5,797,936 A | 8/1998 | Snipes | |
| 5,799,709 A | 9/1998 | Shipley | |
| 5,891,516 A | 4/1999 | Gstrein | |
| 5,913,339 A | 6/1999 | Lee | |
| 6,000,441 A | 12/1999 | Lee et al. | |
| 6,124,015 A | 9/2000 | Baker et al. | |
| 6,284,678 B1 * | 9/2001 | Kobayashi et al. | 442/207 |
| 6,378,566 B1 | 4/2002 | Kornett | |
| 6,397,899 B1 * | 6/2002 | Kobayashi et al. | 139/383 A |
| 6,470,944 B1 * | 10/2002 | Billings et al. | 156/462 |
| 6,510,873 B2 * | 1/2003 | Nagura | 139/383 A |
| 6,589,392 B1 * | 7/2003 | Skinner et al. | 162/348 |
| 6,699,367 B2 * | 3/2004 | Gstrein et al. | 162/358.2 |
| 6,723,208 B1 | 4/2004 | Hansen | |
| 6,780,800 B2 * | 8/2004 | Itoh | 442/190 |
| 6,790,796 B2 * | 9/2004 | Smith et al. | 442/189 |
| 6,875,314 B2 * | 4/2005 | Korfer et al. | 162/358.2 |
| 7,395,840 B2 * | 7/2008 | Ito | 139/383 A |
| 7,478,655 B2 * | 1/2009 | Nakajima | 139/383 A |
| 2003/0068948 A1 * | 4/2003 | Smith et al. | 442/189 |
| 2003/0148687 A1 * | 8/2003 | Korfer et al. | 442/304 |
| 2003/0226611 A1 * | 12/2003 | Moriarty et al. | 139/383 R |
| 2004/0127125 A1 * | 7/2004 | Kornett | 442/181 |
| 2004/0127127 A1 * | 7/2004 | Eagles | 442/195 |
| 2004/0182467 A1 | 9/2004 | Gstrein | |
| 2005/0085148 A1 * | 4/2005 | Baumgartner et al. | 442/279 |
| 2006/0278296 A1 * | 12/2006 | Ito | 139/383 A |
| 2007/0155272 A1 * | 7/2007 | Baumgartner et al. | 442/320 |
| 2008/0006340 A1 * | 1/2008 | Nakajima | 139/383 A |
| 2008/0135200 A1 * | 6/2008 | Harwood | 162/358.2 |
| 2008/0230199 A1 * | 9/2008 | Harwood | 162/358.2 |
| 2012/0098161 A1 * | 4/2012 | Breuer et al. | 264/337 |
| 2012/0145349 A1 * | 6/2012 | Ogiwara | 162/358.2 |

FOREIGN PATENT DOCUMENTS

| | | |
|---|---|---|
| EP | 0 563 206 | 2/1996 |
| EP | 0 964 088 | 12/1999 |
| EP | 1 035 252 | 9/2000 |
| EP | 1 270 807 | 1/2003 |
| EP | 1 803 842 A2 | 7/2007 |
| FR | 1 395 138 | 7/1965 |
| FR | 2 137 234 | 12/1972 |
| FR | 2 549 466 | 1/1985 |
| GB | 1 220 531 | 1/1971 |
| JP | 03140209 | 6/1991 |
| JP | 8-229910 | 9/1996 |
| WO | WO 80 01086 | 5/1980 |

OTHER PUBLICATIONS

International Search Report, PCT/US98/19850, dated Jan. 26, 1999.
Phyllis G. Tortora et al., Understanding Textiles, 1997, Merrill/Prentice Hall, Inc/Simon & SchusterNiacom, 5$^{th}$ ed., pp. 250 and 251.
International Search Report and the Written Opinion on PCT/US2012/044682, mailed on Sep. 28, 2012.

* cited by examiner

FELT FOR FORMING FIBER CEMENT ARTICLES AND RELATED METHODS

RELATED APPLICATION

The present application is a continuation of U.S. patent application Ser. No. 13/534,353, filed Jun. 27, 2012, and claims the benefit of and priority from U.S. Provisional Patent Application No. 61/504,794, filed Jul. 6, 2011, the disclosure of which is hereby incorporated herein in its entirety.

FIELD OF THE INVENTION

The present invention relates generally to fabrics, and more particularly to fabrics employed to form articles of fiber cement.

BACKGROUND OF THE INVENTION

Fiber cement is a well-known material employed in many building components, such as siding, roofing and interior structures, and in pipes, particularly for waste water transport. Fiber cement typically comprises a mixture of cement (i.e., lime, silica and alumina), clay, a thickener, inorganic fillers such as calcium carbonate, and one or more fibrous materials. In the past, asbestos was commonly included as the fibrous material (see U.S. Pat. No. 4,216,043 to Gazzard et al.); because of the well-documented problems asbestos presents, now fiber cement typically includes a natural or synthetic fiber, such as acrylic, aramid, polyvinyl alcohol, polypropylene, cellulose or cotton. Fiber cement is popular for the aforementioned applications because of its combination of strength, rigidity, impact resistance, hydrolytic stability, and low thermal expansion/contraction coefficient.

To be used in siding or roofing components, fiber cement is often formed in sheets or tubes that can be used "as is" or later cut or otherwise fashioned into a desired shape. One technique of forming fiber cement articles is known as the Hatschek process. A fiber cement forming apparatus using the Hatschek process typically includes a porous fabric belt positioned on a series of support rolls. An aqueous fiber cement slurry of the components described above is created and deposited as a thin sheet or web on the porous fabric belt. The slurry is conveyed by the fabric belt over and through a series of rollers to flatten and shape the slurry. As the slurry is conveyed, moisture contained therein drains through openings in the fabric. Moisture removal is typically augmented by the application of vacuum to the slurry through the fabric (usually via a suction box located beneath the porous fabric). After passing through a set of press rolls, the fiber cement web can be dried and cut into individual sheets, collected on a collection cylinder for subsequent unrolling and cutting into individual sheets, or collected as a series of overlying layers on a collecting cylinder that ultimately forms a fiber cement tube.

The porous fabric used to support the slurry as moisture is removed is typically woven from very coarse (between about 2500 and 3000 dtex) polyamide yarns. Most commonly, the yarns are woven in a "plain weave" pattern, although other patterns, such as twills and satins, have also been used. Once they are woven, the yarns are covered on the "sheet side" of the fabric (i.e., the side of the fabric that contacts the fiber cement slurry) with a batt layer; on some occasions, the "machine side" of the fabric (i.e., the side of the fabric that does not contact the slurry directly) is also covered with a batt layer. The batt layer assists in the retrieval, or "pick-up," of the slurry from a vat or other container for processing. Because of the presence of the batt layer(s), the fabric is typically referred to as a fiber cement "felt."

Fiber cement felts typically include one or more base fabric layers that are formed into endless belts. The base fabric layers can be "flat-woven" and permanently joined after weaving into an endless belt, or the fabric layers can be woven in endless form. The longitudinal ends of flat-woven fabrics are generally joined in order to form an endless belt.

Some fiber cement products benefit from indentations in the surface, known as "marking," in order to improve bonding of overlying layers. Such fiber cement product is typically used in roofing sheets, corrugated sheets, pipe and the like. Felts that produce marking often employ heavy spunbond CMD yarns in combination with spunbond-multifilament hybrid MD yarns. However, these felts can suffer from contamination and reduced ability to mark over time. It may be desirable to provide a fiber cement product that addresses these shortcomings.

SUMMARY OF THE INVENTION

As a first aspect, embodiments of the invention are directed to a fiber cement felt comprising: a base fabric layer including MD and CMD yarns interwoven with each other, wherein the CMD yarns comprise twisted monofilaments; and at least one batt layer overlying the base fabric layer. In this configuration, the fiber cement felt may have improved properties over existing fiber cement felts, including easier cleaning, better abrasion resistance of the CMD yarns, improved compaction resistance, higher CMD strength, and better protection of the MD yarns by the CMD yarns.

As a second aspect, embodiments of the invention are directed to a method of forming a fiber cement article, comprising the steps of: (a) providing a fiber cement felt, the fiber cement felt comprising: a base fabric layer including MD and CMD yarns interwoven with each other, wherein the CMD yarns comprise twisted monofilaments; and at least one batt layer overlying the base fabric layer; (b) positioning the fiber cement felt on a series of support rolls of a fiber cement forming machine; (c) depositing a fiber cement slurry on the fiber cement felt; and (d) removing moisture from the slurry to form a fiber cement web.

DETAILED DESCRIPTION OF EMBODIMENTS OF THE INVENTION

Figure 1:
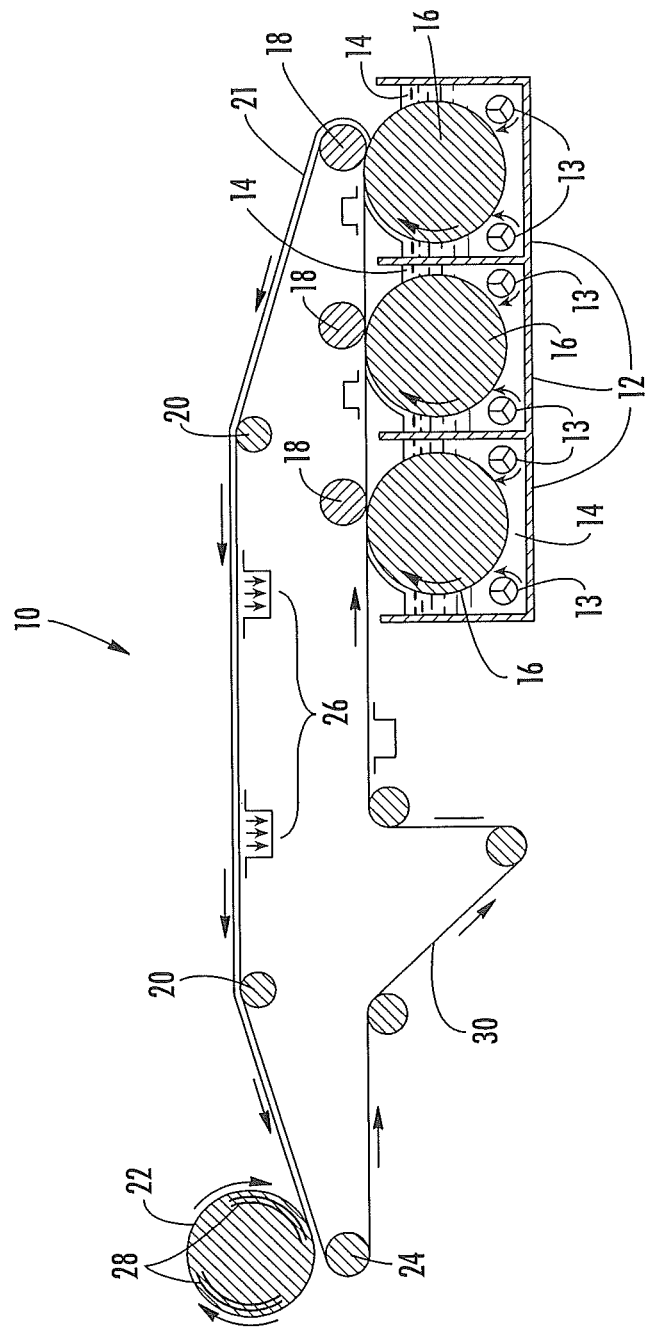
FIG. 1 is a schematic illustration of a fiber cement forming apparatus of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

As used herein, the terms machine direction ("MD") and cross machine direction ("CMD") refer, respectively, to a direction aligned with the direction of travel of the fiber cement felt on the fiber cement forming machine, and a direction parallel to the fabric surface and traverse to the direction of travel. Likewise, directional references to the vertical relationship of the yarns in the fabric (e, g., above, below, top, bottom, beneath, etc.) assume that the fiber cement making surface of the fabric is the top of the fabric and the machine side surface of the fabric is the bottom of the fabric.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

Referring now to FIG. 1, a fiber cement forming apparatus, designated broadly at 10, is illustrated therein. The forming apparatus 10, which performs a typical Hatschek process, generally includes an endless fiber cement felt 30 positioned in rolling contact with and driven by a number of guide rolls 20. Beginning in the lower right corner of FIG. 1, the felt 30 passes above three vats 12, each of which contains a batch of fiber cement slurry 14. As used herein, "fiber cement" means any cementitious composition including cement, silica, and fiber for reinforcement, including asbestos, polyvinyl alcohol, polypropylene, cotton, wood or other cellulosic material, acrylic, and aramid. It is contemplated that other materials such as thickeners, clays, pigments, and the like, that impart desirable processing or performance characteristics to the fiber cement slurry 14 or an article formed therefrom may also be included. Each vat 12 is positioned below a deposition cylinder 16 mated with a couch roll 18. Each vat 12 also includes agitators 13, which prevent the fiber cement slurry 14 from solidifying therein.

Rotation of each deposition cylinder 16 collects fiber cement slurry 14 on the cylinder's surface; as the felt 30 travels over and contacts the cylinder 16, the slurry 14 is transferred from the cylinder 16 to the felt 30. The amount of slurry 14 deposited on the fabric 30 by each cylinder 16 is controlled by the corresponding couch roll 18. Typically, the fiber cement slurry 14 is deposited as a web 21 at a thickness of between about 0.3 mm and 3 mm.

Still referring to FIG. 1, once the fiber cement slurry web 21 has been collected on the felt 30 from each of the vats 12, the felt 30 conveys the slurry web 21 over one guide roll 20, then over one or more suction boxes 26 (two are shown in FIG. 1), each of which applies negative pressure to the felt 30, thereby encouraging the removal of moisture from the slurry web 21. Finally, the felt 30 and the slurry web 21 pass over a second guide roll 20, then between the nip formed by a breast roll 24 and a forming roll 22. After passing through the nip, the slurry web 21 has formed into a semi-solid fiber cement sheet 28 that is collected on the surface of the forming roll 22.

Those skilled in this art will recognize that other forming apparatus are also suitable for use with the fiber cement felts of the present invention. For example, felts of the present invention can also be used to form fiber cement pipes. In such an operation, the fiber cement sheet 28 can be collected in contacting layers on a forming roll; as they dry, the overlying layers form a unitary laminated tube. Often, a pipe forming apparatus will include small couch rolls that act in concert with the forming roll to improve interlaminar strength. Also, a second felt may travel over the additional couch rolls to assist in water absorption and finishing.

Figure 2:
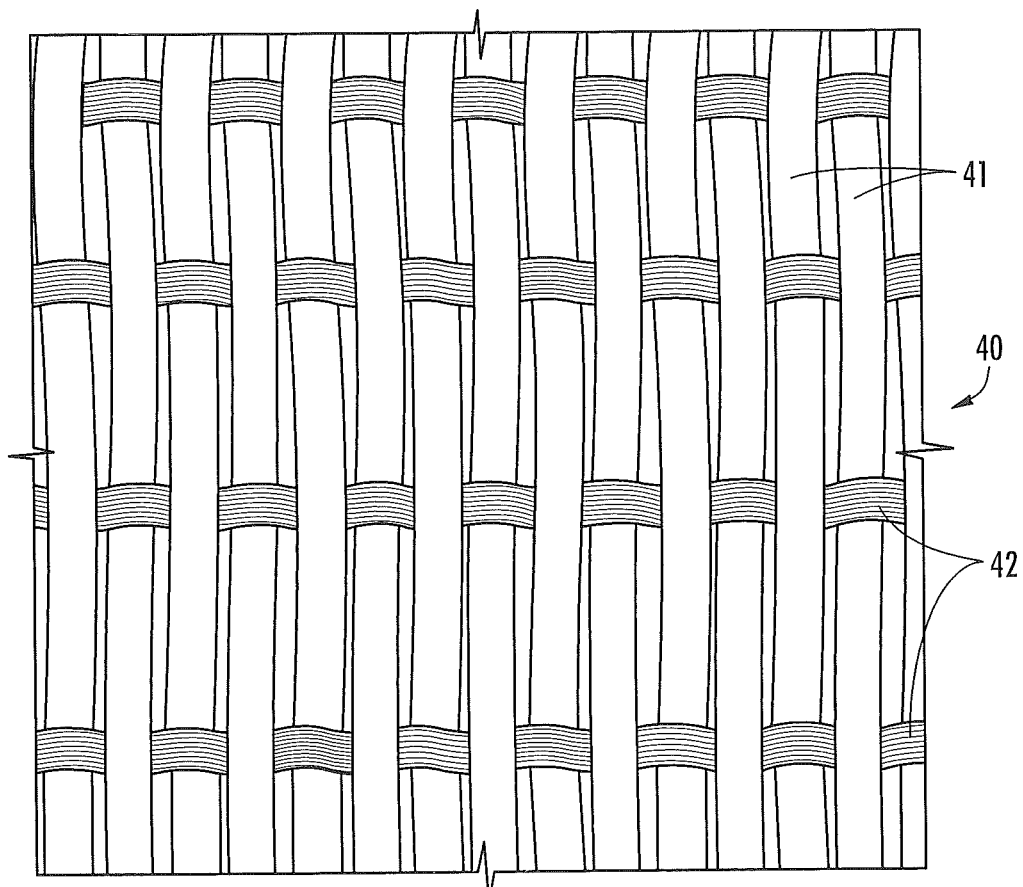
FIG. 2 is a top perspective view of a portion of a base fabric of a fiber cement felt according to embodiments of the present invention, with CMD yarns shown extending in the horizontal direction and MD yarns shown extending in the vertical direction.

A portion of a base fabric for a fiber cement felt 30, designated broadly at 40, is shown in FIG. 2. The fabric 10 includes MD yarns 41 and CMD yarns 42 interwoven with each other in a plain weave pattern (i.e., an "over 1/under 1" pattern). This pattern repeats itself over the expanse of the fabric 40.

In the fabric 40, the CMD yarns 42 are monofilament twists. In some embodiments, the CMD yarns 42 are monofilament twists with substantially no spunbond material present. An exemplary CMD yarn is a monofilament twist with a 0.3×2×3 structure; this nomenclature indicates that the individual monofilaments are (a) 0.3 mm in diameter that are (b) twisted into pairs, the twisted pairs then being (c) twisted into triplets. In other words, each yarn includes three pairs of twisted 0.3 mm monofilaments. In some embodiments, the monofilaments are formed of polyamide (nylon), and in particular may be polymamide-6 (nylon-6). The CMD yarns are typically of a size of 200-800 tex. Other possibilities include monofilament twists of the following constructions: 0.3×2×4; 0.3×3×3; 0.2×3×4; and 0.2×3×5.

The MD yarns 41 are typically spunbond-multifilament hybrid yarns, but may include other varieties. An exemplary MD yarn is one formed from a twist of a spunbond yarn (available from Tonak, a.s., Czech Republic) and a polyamide multifilament yarn (e.g., a 3×4 construction of polyamide multifilament, available from Invista, Wichita, Kans.). Other multifilament constructions may include 3×5, 3×6 or 3×9 arrangements. The MD yarns are typically of a size of 1000-5000 tex.

Figure 3:
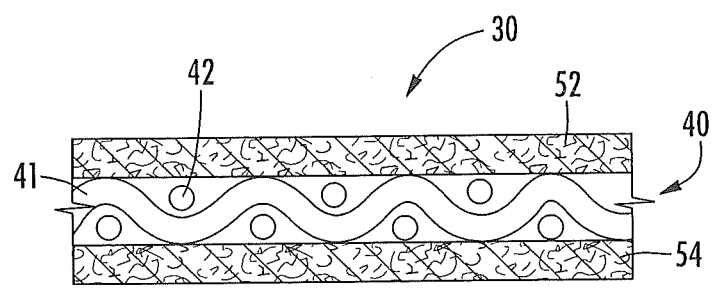
FIG. 3 is a schematic section view of a fiber cement felt that includes the base fabric of FIG. 2.

As shown in FIG. 3, the felt 30 also includes a top batt layer 52 that overlies the fabric 40 and a bottom batt layer 54 that underlies the fabric 40. The batt layers 52, 54 may be formed of material, such as a synthetic fiber like acrylic aramid, polyester, or polyamide, or a natural fiber such as wool, that assists in taking up fiber cement slurry 14 from the vats 12 to form the fiber cement web 21 in FIG. 1. Exemplary materials include polyamide, polyester and blends thereof. The weight of the batt layers can vary, although it is preferable that the ratio of fabric weight to batt weight is about between about 1.0 and 2.0 with 1.5 being more preferred. Also, in some embodiments, it may be desirable to omit the bottom batt layer.

A fiber cement felt employing a base fabric such as fabric 30 may have improved properties over existing fiber cement felts, including easier cleaning, better abrasion resistance of the CMD yarns, improved compaction resistance, higher CMD strength, and better protection of the MD yarns by the CMD yarns. In particular, the CMD yarns may have a lower specific surface than prior CMD yarns, which assists in weight and reduced felt thickness.

The foregoing is illustrative of the present invention and is not to be construed as limiting thereof Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined herein in the following claims.

That which is claimed is:

1. A fiber cement felt comprising:
    a base fabric layer including MD and CMD yarns interwoven with each other, wherein the CMD yarns comprise twisted monofilaments substantially free of spunbond material, and wherein the MD yarns comprise spunbond-multifilament hybrid yarns; and
    at least one batt layer overlying the base fabric layer.

2. The fiber cement felt defined in claim 1, wherein the MD yarns and CMD yarns are interwoven in a plain weave pattern.

3. The fiber cement felt defined in claim 1, wherein the twisted monofilaments have a structure selected from the group consisting of: 0.3×2×3; 0.3×2×4; 0.3×3×3; 0.2×3×4; and 0.2×3×5.

4. The fiber cement felt defined in claim 1, wherein the CMD yarns have a size of between about 200 and 800 tex.

5. A method of forming a fiber cement article, comprising the steps of:
    (a) providing a fiber cement felt, the fiber cement felt comprising:
        a base fabric layer including MD and CMD yarns interwoven with each other, wherein the CMD yarns comprise twisted monofilaments substantially free of spunbond material, and wherein the MD yarns comprise spunbond-multifilament hybrid yarns; and
        at least one batt layer overlying the base fabric layer;
    (b) positioning the fiber cement felt on a series of support rolls of a fiber cement forming machine;
    (c) depositing a fiber cement slurry on the fiber cement felt; and
    (d) removing moisture from the slurry to form a fiber cement web.

6. The method defined in claim 5, wherein the MD yarns and CMD yarns are interwoven in a plain weave pattern.

7. The method defined in claim 5, wherein the twisted monofilaments have a structure selected from the group consisting of: 0.3×2×3; 0.3×2×4; 0.3×3×3; 0.2×3×4; and 0.2×3×5.

8. The method defined in claim 5, wherein the CMD yarns have a size of between about 200 and 800 tex.

9. The method defined in claim 5, wherein the fiber cement web includes indentations imparted by the fiber cement felt.

10. A fiber cement felt comprising:
    a base fabric layer including MD and CMD yarns interwoven with each other, wherein the CMD yarns comprise twisted monofilaments having a size of between about 200 and 800 tex substantially free of spunbond material, and wherein the MD yarns comprise spunbond-multifilament hybrid yarns and have a size of between about 1000 and 5000 tex; and
    at least one batt layer overlying the base fabric layer.

* * * * *